United States Patent
Erriquez et al.

(10) Patent No.: US 12,493,287 B2
(45) Date of Patent: Dec. 9, 2025

(54) DEVICES, SYSTEMS AND METHODS FOR AUTOMATICALLY PREDICTING MAINTENANCE EVENTS

(71) Applicant: Caterpillar Inc., Peoria, IL (US)

(72) Inventors: Alexandre Erriquez, Chene-Bourg (CH); Arnaud Dubreuil, Bassy (FR); Travis A. Busen, Chicago, IL (US); Stephen Berning, Germantown Hills, IL (US); Davide Gerbaudo, Peron (FR); Jose Pitteloud, Chene-Bourg (CH); Brandon Bill, Washington, IL (US); Guillaume Gard, Geneva (CH)

(73) Assignee: Caterpillar Inc., Peoria, IL (US)

(*) Notice: Subject to any disclaimer, the term of this patent is extended or adjusted under 35 U.S.C. 154(b) by 383 days.

(21) Appl. No.: 17/703,557

(22) Filed: Mar. 24, 2022

(65) Prior Publication Data
US 2022/0317678 A1   Oct. 6, 2022

Related U.S. Application Data

(60) Provisional application No. 63/169,085, filed on Mar. 31, 2021.

(51) Int. Cl.
*G05B 23/02* (2006.01)

(52) U.S. Cl.
CPC ................ *G05B 23/0283* (2013.01)

(58) Field of Classification Search
None
See application file for complete search history.

(56) References Cited

U.S. PATENT DOCUMENTS

| | | | |
|---|---|---|---|
| 6,138,056 A * | 10/2000 | Hardesty | G05B 19/4063 408/11 |
| 6,816,815 B2 * | 11/2004 | Takayama | G05B 23/0283 702/184 |
| 10,032,317 B2 | 7/2018 | Singh et al. | |
| 10,540,618 B2 | 1/2020 | Margherio et al. | |
| 10,657,454 B2 | 5/2020 | Singh et al. | |
| 2002/0032544 A1 * | 3/2002 | Reid | G01H 1/003 702/183 |
| 2002/0138406 A1 * | 9/2002 | Elgabry | G06Q 40/03 705/38 |
| 2015/0310674 A1 | 10/2015 | Humphrey et al. | |
| 2016/0253634 A1 | 9/2016 | Thomeer et al. | |

(Continued)

OTHER PUBLICATIONS

Rich, Frederick Ashburn. Managing the wear of heavy construction equipment steel track undercarriage by soil sand content. Diss. Indiana State University, 2020. (Year: 2020).*

(Continued)

*Primary Examiner* — Carlos R Ortiz Rodriguez

(57) ABSTRACT

The present technology is generally directed to maintenance event prediction systems for industrial machines. In some embodiments, a maintenance event prediction system configured in accordance with embodiments of the present technology can receive information associated with one or more past maintenance events for a machine, use the received information to identify additional information about the machine, and predict a future maintenance event and/or a time until the future maintenance event based at least partially on the received information and/or the additional information.

18 Claims, 7 Drawing Sheets

(56) References Cited

U.S. PATENT DOCUMENTS

| | | |
|---|---|---|
| 2017/0249554 A1 | 8/2017 | Zirnstein |
| 2020/0142923 A1 | 5/2020 | Kusaki et al. |
| 2020/0285227 A1 | 9/2020 | Spiro et al. |
| 2020/0357200 A1* | 11/2020 | Wang .................. G07C 5/0841 |

OTHER PUBLICATIONS

Gillespie, James S., and Adam S. Hyde. The replace repair decision for heavy equipment. No. FHWA/VTRC 05-R8. Virginia Transportation Research Council (VTRC), 2004. (Year: 2004).*

Gransberg, Douglas D., and Edward Patrick O'Connor. Major equipment life-cycle cost analysis. No. MN/RC 2015-16. Minnesota Department of Transportation, Research Services & Library, 2015. (Year: 2015).*

* cited by examiner

# DEVICES, SYSTEMS AND METHODS FOR AUTOMATICALLY PREDICTING MAINTENANCE EVENTS

CROSS-REFERENCE TO RELATED APPLICATION

The present application claims priority to U.S. Provisional Patent Application No. 63/169,085, filed Mar. 31, 2021, titled "SYSTEMS AND METHODS FOR AUTOMATICALLY RECOMMENDING REPAIR EVENTS," the entirety of which is hereby incorporated by reference herein.

TECHNICAL FIELD

The present disclosure relates generally to devices, systems, and methods for automatically predicting maintenance events.

BACKGROUND

Machines often include components with parts that can gradually fail over time. Generally, machine maintenance should be performed before a part or component of the machine fails, so as to avoid increased maintenance costs and/or machine downtime. However, a lack of access to data regarding a machine's repair history can limit the ability to accurately predict what maintenance a machine should undergo and when that maintenance should be performed.

SUMMARY

Figure 1A:
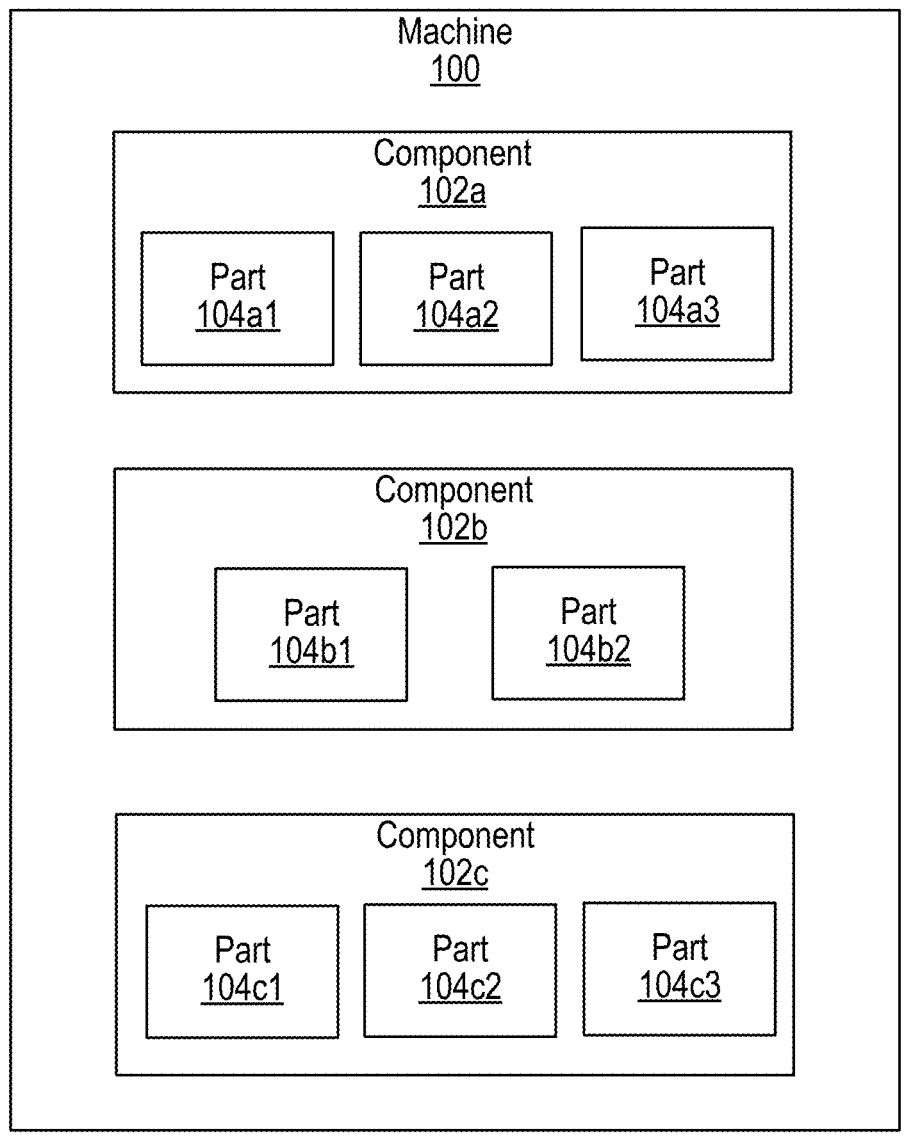
FIG. 1A is a schematic illustration of a machine in accordance with embodiments of the present technology.

In some embodiments the present technology includes a method for providing future maintenance event predictions for an industrial machine based on partial maintenance history data for the industrial machine can include receiving information associated with a past maintenance event of the industrial machine; identifying maintenance information associated with the past maintenance event based at least partially on the received information, and predicting a time until a future maintenance event for the industrial machine. The identified maintenance information can include at least one of (i) a type of the industrial machine, (ii) a component of the industrial machine that was serviced during the past maintenance event, and/or (iii) a category of the past maintenance event. The predicted time until the future maintenance event can be based at least partially on the identified maintenance information, such as at least one of the type of the industrial machine, the component that was serviced during the past maintenance event, and/or the category of the past maintenance event.

Additionally, or alternatively, the present technology includes a maintenance event prediction system for predicting future maintenance events for industrial machines based on partial maintenance history data can include one or more processors; and a non-transitory computer readable memory having instructions that, when executed by the one or more processors, cause the maintenance event prediction system to collect information associated with a past maintenance event of an industrial machine; identify maintenance information associated with the past maintenance event; and/or predict a time until a future maintenance event for the industrial machine. The identified maintenance information can be based at least partially on the collected receive information, and can include one or more of (i) a type of the industrial machine, (ii) a component of the industrial machine that was serviced during the past maintenance event, and/or (iii) a category of the past maintenance event. The predicted time until the future maintenance event can be based at least partially on the identified maintenance information, such as at least one of the type of the industrial machine, the component that was serviced during the past maintenance event, and/or the category of the past maintenance event.

In these and other embodiments, the present technology includes a non-transitory computer-readable media storing computer-executable instructions for predicting future maintenance events for industrial machines based on partial maintenance history data that, when executed by one or more processors of a maintenance event prediction system, cause the maintenance event prediction system to performing one or more operations. The operations can include receiving information associated with a past maintenance event of an industrial machine, identifying maintenance information associated with the past maintenance event; and predicting a time until a future maintenance event for the industrial machine. The identified maintenance information can be based at least partially on the received information, and can include at least one of (i) a type of the industrial machine, (ii) a component of the industrial machine that was serviced during the past maintenance event, and (iii) a category of the past maintenance event. The predicted time until the future maintenance event be based at least partially on the identified maintenance information, such as at least one of the type of the industrial machine, the component that was serviced during the past maintenance event, and/or the category of the past maintenance event.

DETAILED DESCRIPTION

The present technology is generally directed to maintenance event prediction systems, and associated devices and methods. In some embodiments, a maintenance event prediction system configured in accordance with embodiments of the present technology can (i) collect information associated with one or more past maintenance events for a machine, (ii) use the collected information to identify additional information about the machine, and/or (iii) predict a future maintenance event and/or a time until the future maintenance event based at least partially on the received information and/or the additional information. For example, the maintenance event prediction system can receive invoices, work orders, parts orders, and the like, and analyze these received documents to identify the parts of a machine being replaced during a past maintenance event. Generally, machine parts are not purchased randomly and are instead purchased in response to a repair or maintenance need. Accordingly, in some aspects of the present technology, analyzing invoices and other parts purchase data is expected to provide an accurate, reliable source of data for identifying information related to a machine's maintenance history, predicting future maintenance events, and/or predicting times until the future maintenance events.

In at least some embodiments, the maintenance event prediction system can identify one or more indicator parts from the received information (e.g., parts purchase data). The indicator parts can be associated with specific components and/or specific maintenance events. As such, the indicator parts can be used to identify the components being serviced and/or the category of the past maintenance event. The maintenance event prediction system can also use the received information to identify (i) a type or class of the machine being serviced during the past maintenance event, (ii) one or more components of the machine that the identified part(s) were used to service, and/or (iii) a type or category of the past maintenance event. In some aspects, this can allow the maintenance event prediction system to predict, supplement, or "gap fill" a given machine's maintenance history when such data is not readily available.

Accordingly, the maintenance event prediction system can identify information associated with the machine, predict future maintenance events, and/or predict a time until a future maintenance event based at least partially on the parts purchase data and other received information. In some aspects of the present technology, the parts purchase data can be used to identify information about a given machine's maintenance history (e.g., the component that was serviced, the type or category of the past maintenance event, and the like) based on incomplete or partial information about the machine's maintenance history, such as when the machine's maintenance history information is not recorded, not reported, or otherwise inaccessible; this is expected to increase the availability of machine maintenance history information for further processing and/or analysis, for example, to predict future maintenance events and/or times until the future maintenance events.

A person skilled in the art will understand (i) that the technology may have additional embodiments than those illustrated and described herein with reference to FIGS. 1-6, and (ii) that the technology may be practiced without several of the details of the embodiments described herein with reference to FIGS. 1-6.

A. SELECT EMBODIMENTS OF DEVICES, SYSTEMS AND METHODS FOR AUTOMATICALLY PREDICTING MAINTENANCE EVENTS

FIG. 1A is a schematic diagram illustrating a machine 100 in accordance with embodiments of the present technology. In some embodiments, the machine 100 can be an industrial machine, a vehicle, a truck, a tracked-type tractor, an excavator, a wheel loader, a front-end loader, and/or a motor grader. In other embodiments, the machine 100 can be any other suitable machine.

The machine 100 can include one or more components 102. In the illustrated embodiment, for example, the machine 100 includes a first component 102a, a second component 102b, and a third component 102c. In other embodiments, the machine 100 can include more or fewer components, such as less than three, more than three, or any other suitable number of components. Each of the machine's components 102 can be associated with the operation (e.g., structure, function, and the like) of the machine 100. For example, at least one of the components 102 can function independently or in combination with one or more of the other components to perform activities associated with the machine. The components 102 of the machine can include one or more engines, transmissions, torque converters, final drives, differentials, axles, brakes, cylinders, pump and motors, undercarriages, hydraulic systems, work tools, traction motors, injectors, and/or any other suitable component.

Each of the machine's components 102 can include one or more parts 104. In the illustrated embodiment, for example, the first component 102a includes a first part 104a1, a second part 104a2, and a third part 104a3; the second component 102b includes a first part 104b1 and a second part 104b2; and the third component 102c includes a first part 104ci, a second part 104c2, and a third part 104c3. In other embodiments, each of the machine's components can include more or fewer parts, such as at least one, four, five, six, seven, or any other suitable number of parts. Each of the machine's parts 104 can be associated with the operation (e.g., structure, function, and the like) of one or more of the machine's components 104. For example, the parts 104 of the machine 100 can include one or more gears, pistons, liners, rods, cylinders, valves, valve caps, actuators, solenoids, pins, bolts, fasteners, ring and pinions, arms, brackets, plates, wires, processors, microcomputers, controllers, sensors, springs, and/or any other suitable parts.

Over time, the machine 100, at least one of the components 102, and/or at least one of the parts 104 may undergo maintenance or repair events. For example, the machine 100 may be subject to regularly scheduled maintenance based on a selected number of hours of operation or units of distance driven. The machine 100 may also be subject to unscheduled maintenance events, such as repair or replacement of one or more of the components 102 and/or one or more of the parts 104 thereof that wear or break at variable rates due to, for example, environmental conditions, usage patterns, maintenance history, and/or other variable factors. The maintenance events can be specific to individual components 104. For example, an engine of the machine can undergo top-end maintenance, bottom-end maintenance, in-frame repair, and/ or a full rebuild; during each of these engine maintenance events.

In some embodiments, at least one of the parts 104 can be an indicator part (which can also be referred to as a predictive part, an identifying part, a key part, a marker part, and the like). The indicator part can be used to identify one or more of the components 102 that was subject to a past maintenance event, such that the indicator part can be used to identify information about a past maintenance event for the machine. For example, an invoice including the indicator part can be used to identify at least one of (i) a type or classification of the machine 100, (ii) a component 104 of the machine 100 that was serviced during the past maintenance event, and (iii) a type or category of the past maintenance event; this is described in detail below regarding FIGS. 2-6.

The machine 100 can be associated with an operator (e.g., an owner, a driver, a purchaser, and the like). Although a single machine is shown in FIG. 1A, the operator may be associated with multiple machines (e.g., a fleet of machines), and each of the machine can include at least some aspects that are generally similar or identical in structure and/or function to the machine 100.

Figure 1B:
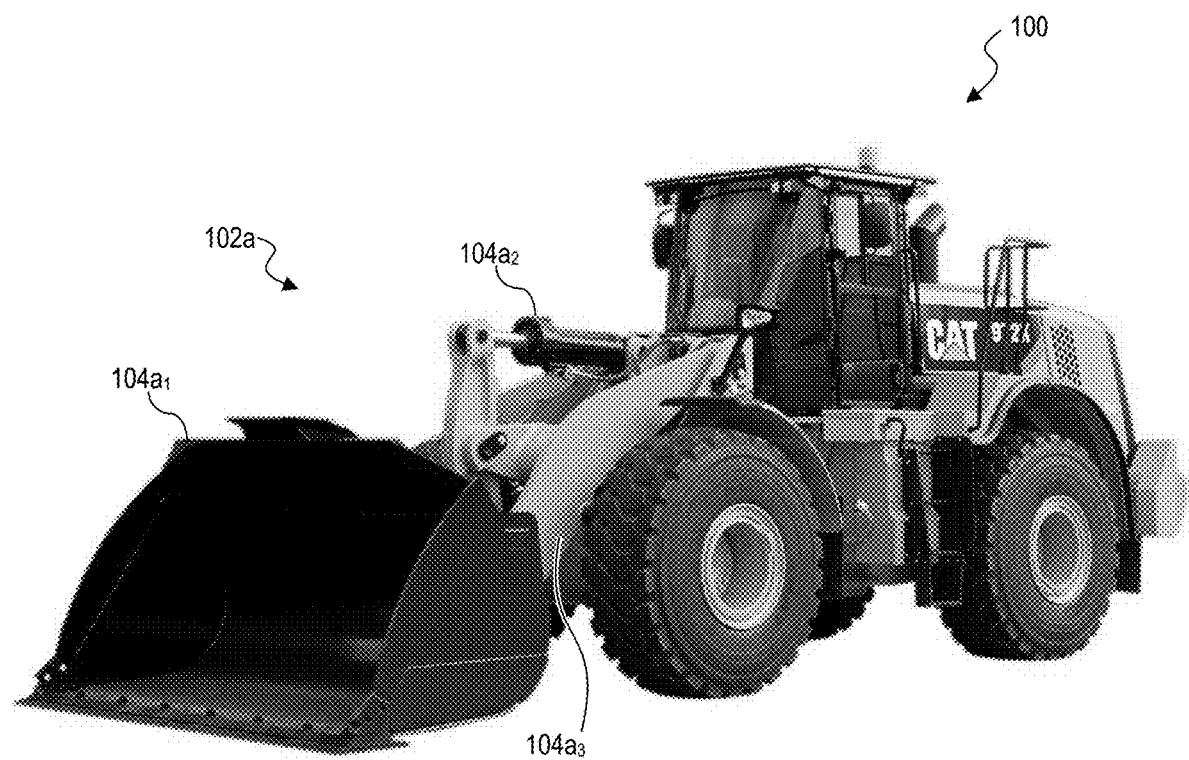
FIG. 1B is a perspective view of one example of the machine of FIG. 1A, in accordance with embodiments of the present technology.

FIG. 1B is a perspective view of one example of the machine 100, in accordance with embodiments of the present technology. In the illustrated embodiment, the machine 100 includes a first component or work tool 102a. The work tool 102a can include a first part or bucket $104a_1$, a second part or actuator $104a_2$, and a third part or arm $104a_3$. In the illustrated embodiment, the bucket $104a_1$ is an indicator part for the work tool 102a. Accordingly, a document (e.g., an invoice) indicating the purchase of a replacement bucket can be used to identify that (i) a given operator owns a machine including the bucket $104a_1$ (e.g., a front-end loader), (ii) the bucket was serviced during a past maintenance event, and (iii) that servicing the front-end loader included replacing the bucket $104a_1$. Although not labeled in FIG. 1B, it will be appreciated that the machine 100 can include additional components, such as an engine, a transmission, and the like.

Figure 2:
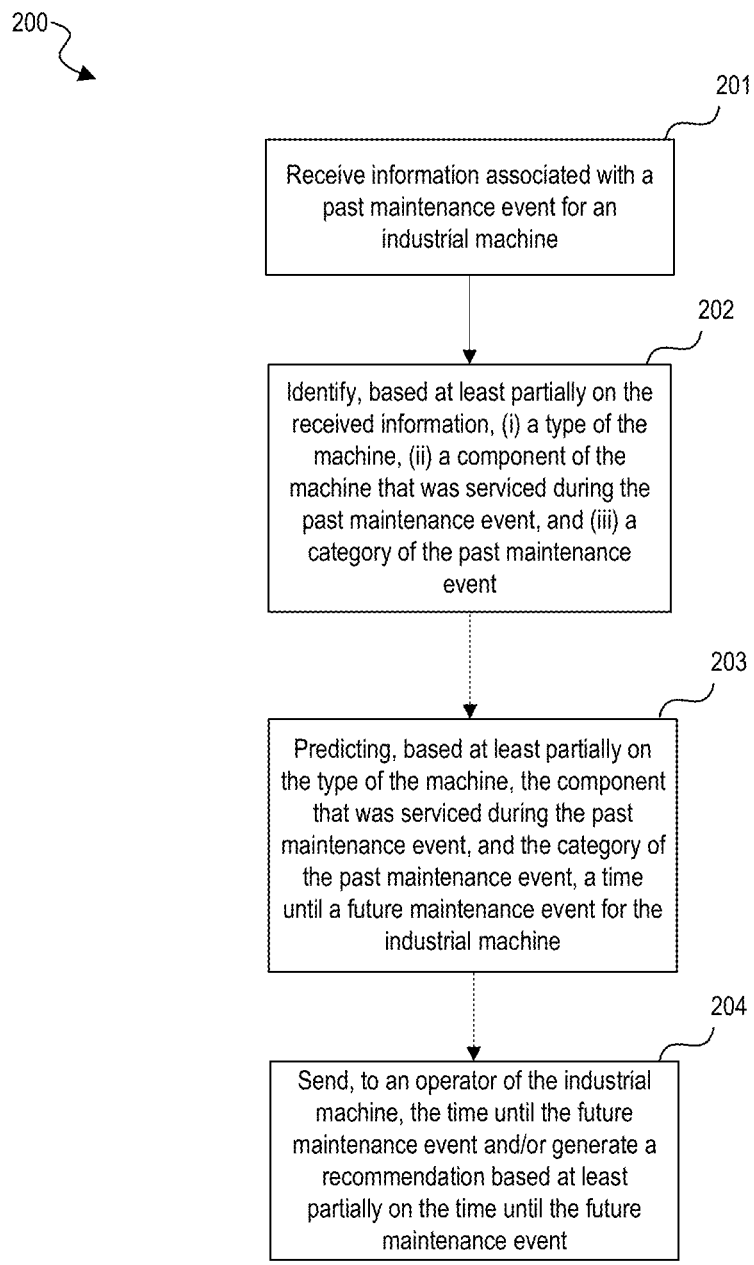
FIG. 2 is a flow diagram illustrating a method for predicting maintenance events for machines in accordance with embodiments of the present technology.

FIG. 2 is a flow diagram illustrating a method 200 for predicting maintenance events for machines in accordance with embodiments of the present technology. The method 200 is illustrated as a set of blocks, steps, operations, or processes 201-204. Several of the blocks 201-204 are described with reference to FIG. 1. All or a subset of the blocks 201-204 can be executed at least in part by various components of a device and/or a system, such as the device 400 of FIG. 4, and/or any other suitable device and/or system. Additionally, or alternatively, all or a subset of the blocks 201-204 can be executed at least in part by an operator (e.g., a remote operator, a human operator, an institutional operator, a corporate operator, and the like) of the device and/or system. Furthermore, any one or more of the blocks 201-204 can be executed in accordance with the discussion herein.

The method 200 can begin at block 201 by receiving information associated with a past repair event for a machine. Aspects of the machine can be generally similar or identical in structure and/or function to aspects of the machine 100 of FIG. 1. In at least some embodiments, for example, receiving information includes receiving the information for an industrial machine, and/or one or more components and/or parts thereof.

The received information can be any information related to the machine. In at least some embodiments, for example, receiving the information can include receiving one or more parts identifiers. Each of the parts identifiers can be associated with an identity of a part of the machine and can include a name, a number, a serial number, a code, a price, a manufacturing cost, a quantity purchased, and/or any other suitable parts identifier. The received information can be in any suitable form. In at least some embodiments, for example, receiving the information can include receiving the information from one or more invoices, component order forms, work orders, transactions, ecommerce transaction, price quotes, records of incomplete transaction (e.g., items left in or removed from an online shopping cart and not purchased), aftermarket transaction records, manual data entries, and/or any other suitable information sources. In these and other embodiments, receiving the information can include receiving information for all or a subset of past repair events for the machine.

At block 202, the method 200 continues by identifying, based at least partially on the received information (block 201), information associated with the past maintenance event, including at least one of (i) a type or class of the machine, (ii) a component of the machine that was serviced during the past maintenance event, and/or (iii) a type or category of the past maintenance event. Identifying the type or class of the machine can include identifying a machine identifier. The machine identifier can be associated with the type or class of the machine, and can include a name, a number, a serial number, a code, a price, a manufacturing cost, a quantity purchased, and/or any other suitable machine identifier. Identifying the component that was serviced can include identifying a component identifier. The component identifier can be associated with an identity of the component that was, and can include a name, a number, a serial number, a code, a price, a manufacturing cost, a quantity purchased, and/or any other suitable component identifier. Identifying the type or category of the past maintenance event can include identifying a maintenance event identifier. The maintenance event identifier can be associated with a type or category of the past maintenance event, and can include a name, a number, a serial number, a code, a price, a cost to perform, a time to complete, a quantity performed, and/or any other suitable maintenance event identifier. In at least some embodiments, the maintenance event can be associated with and/or specific to one or more of the machine's components, as described In some embodiments, block 202 can further include identifying at least one indicator part and using the at least one indicator part to identify at least one of (i) the type or class of the machine when combined with the customer fleet and engineering data, (ii) the component that was serviced, (iii) the type or category of the past maintenance event, and/or (iv) a date and/or time associated with the maintenance event (i.e., a time and/or a time range in which the past maintenance event was performed). As described in detail above, the machine can include one or more indicator parts. At least some of the indicator parts can be associated with (e.g., specific to) one or more of the machine's components and/or one or more maintenance events associated with the machine's components. As a specific example, a piston, a cylinder head, and a crankshaft (and/or one or more of their serviceable and/or constituent parts) can each be an indicator part specific to the machine's engine. These indicator parts can be identified in the received information (block 201) and used to identify information associated with the past maintenance event. For example, if the received information includes an invoice including one or more parts numbers associated with a cylinder head assembly, block 202 can include identifying that the maintenance event includes an engine top-end overhaul maintenance event. Continuing with this example, if the received information includes an invoice for the crankshaft, block 202 can include identifying that the past maintenance event includes a bottom-end engine maintenance event. Continuing still with this example, if the received information includes an invoice for the cylinder head and the piston, block 202 can include identifying that the past maintenance event includes an in-frame engine maintenance event. Continuing further with the example, if the received information includes an invoice for the cylinder head, the piston, and the crankshaft, block 202 can include identifying that the past maintenance event includes a full engine rebuild and/or another full engine maintenance event. It will be appreciated that the piston, the cylinder head, and the crankshaft are examples of indicator parts and that, in practice, various machines may include these and/or other indicator parts. In some embodiments, identifying the indicator parts can include automatically identifying one or more of the indicator parts, for example, using a machine learning algorithm, a rules-based algorithm, one or more computer models, and/or a graphical database that identifies relationships between parts and maintenance events. In these and other embodiments, identifying the indicator parts can include any other suitable process or technique for identifying and/or defining indicator parts.

In some aspects of the present technology, the indicator parts can be used to identify/determine information about a given machine's maintenance history based on incomplete or partial information about the machine's maintenance history, such as when the machine maintenance history information is not recorded, not reported, or otherwise inaccessible; this is expected to increase the availability of machine maintenance history information for further processing and/or analysis. For example, and as described in detail below, the machine maintenance history information identified in block 202 can be used to make one or more predictions and/or recommendations related to the machine. Accordingly, increasing the availability of machine maintenance history information can correspondingly increase the number of machines for which predictions and/or recommendations can be made.

In some embodiments, at least one of the (i) the type or class of the machine, (ii) the component that was serviced, and/or (iii) the type or category of the past maintenance event can be identifying based at least partially on a quantity of parts purchased. For example, the received data (block 201) can include a quantity of parts purchased, and block 202 can include sorting/classifying parts based at least partially on the purchased quantity to differentiate between various maintenance events, for example, the extensiveness or severity of the maintenance event. In some aspects, this can include establishing (e.g., manually, automatically, etc.) one or more thresholds to differentiate between various maintenance events. The thresholds can be established based at least in part on the total quantity of a given part that is purchased/ordered for the associated equipment and/or component. For example, if less than 50% of the parts orders associated with a given machine include the piston, the cylinder head, and/or the crankshaft, block 202 can include identifying that the associated engine maintenance event was minor or included parts refresh. Continuing with this example, if between 50% and 75% of the parts orders associated with a given machine include the piston, the cylinder head, and/or the crankshaft, block 202 can include identifying that the associated engine maintenance event was moderate or included a parts reset. Continuing still with the example, if more than 75% of the parts orders associated with a given machine include the piston, the cylinder head, and/or the crankshaft, block 202 can include identifying that the associated engine maintenance event was substantial or included a rebuild.

At block 203, the method 200 continues by determining (e.g., predicting, calculating, modeling, and the like) a time until a future maintenance event. The prediction in block 203 can be based at least partially on the information identified in block 202. For example, if in block 202 it was identified that an engine of the machine was serviced, then block 203 can include predicting the time until a future maintenance event for the engine. The time can include a time between the past maintenance event and the future maintenance event, an amount of time from the date at which block 203 is performed, and/or any other suitable time. In some embodiments, the future maintenance event can be generally similar to or the same as the past maintenance event (block 201), for example, the future maintenance event can include servicing a same machine, component and/or one or more of the same parts. In other embodiments, the future maintenance event can be different than the past maintenance event, for example, a different maintenance event for the same machines, components and/or parts, a same maintenance event for one or more different machines, components and/or parts, and/or a different maintenance event for one or more different machines, components and/or parts. In at least some embodiments, for example, the past maintenance event can be for a first machine in an operator's fleet, and the future maintenance event can be for a second machine in the operator's fleet and of a based at least partially on information associated with the first machine. The second machine can be generally similar or identical in usage, type, configuration, and/or function to the first machine, and/or the second machine may include one or more components and/or parts that are generally similar or identical to the components/parts of the first machine, such that the second machine can be expected to undergo generally similar or identical maintenance events as the first machine, and/or maintenance events at generally similar or identical times and/or time intervals. In these and other embodiments, the future maintenance event can be associated with one or more parts of another component related structurally and/or functionally to the component serviced during the past maintenance event (block 202). For example, if the past maintenance event included servicing a machine's engine, the future maintenance event can include servicing the machine's transmission.

In at least some embodiments, block 203 can further include determining/predicting a price or cost associated with the future maintenance event. The price associated with the future maintenance can include the price/cost of one or more of the components and/or parts associated with the future maintenance event. Additionally, or alternatively, the price can include one or more service fees and/or labor costs associated with the future maintenance event. In these and other embodiments, the price can include an estimated increase in the price or cost associated with the future maintenance event if the future maintenance event is not performed by/before the predicted time.

In some embodiments, block 203 can include determining a time until individual ones of a plurality of future maintenance events. In some embodiments, one or more of the plurality of future maintenance events can be generally similar to or the same as the past maintenance event (block 201), for example, servicing a same machine, component, and/or one or more of the same parts. In other embodiments, one or more of the future maintenances event can be different than the past maintenance event, for example, a different maintenance event for the same machine, components and/or parts; a same maintenance event for one or more different machines, components and/or parts, and/or a different maintenance event for one or more different machines, components and/or parts. In these and other embodiments, the time can include a time between individual ones of the maintenance events, a frequency or probability over time of the maintenance events, and/or any other suitable time.

At block 204, the method 200 continues by sending the time until the future maintenance event (block 203) to an operator of the machine (block 201). In some embodiments, sending the time until the future maintenance event to an operator can include sending the time until the future maintenance event to the operator of the machine 100 described in detail with reference to FIGS. 1A-1B, a product support representative associated with the machine's operator, an owner of the machine, repair personal associated with performing maintenance events on the machine, and/or any other suitable operator or other individual associated with the operation/maintenance of the machine. Sending the time until the future maintenance event can include sending the time until the future maintenance event via wired and/or a wireless communication. In at least some embodiments, for example, sending the time until the future maintenance event to the operator can include wirelessly sending the time until the future maintenance event to a computing device or system (e.g., a sales management tool, a customer relationship management tool, and the like) associated with the operator.

Additionally, or alternatively, at block 204 the method 200 can include generating one or more recommendations and/or predictions. In some embodiments, one or more of the recommendations/predictions can be sent to the operator. Individual ones of the one or more recommendations can be based at least partially on the time until the future maintenance event (block 203), and can be related to the future maintenance event. In at least some embodiments, for example, sending a recommendation can include sending a recommendation to perform the future maintenance event before the predicted time. Additionally, or alternatively, the recommendation can include a recommended time or time window in which the future maintenance event should be performed. In some aspects, recommending that the future maintenance event be performed before the predicted time can inhibit or prevent the associated parts(s), component(s), and/or machine from failing, and/or can reduce the costs of repairing the associated machine, for example, by reducing the likelihood that failure/wear of one part/component leads to the failure/wear of other related part(s)/component(s) and a more expensive maintenance event. In some embodiments, block 204 can include determining one or more of the predictions automatically, for example, based at least partially on a rules-based model, a machine learning model, one or more computer models, and/or any other suitable process or technique.

In some embodiments, the recommendation can include a recommendation to purchase one or more parts, components, tools, and/or the like associated with the future maintenance event. The recommendation can include, for example, a recommendation to purchase one or more parts and/or components for replacement/maintenance during the future maintenance event. In at least some embodiments, the recommendation can include recommending one or more parts and/or components associated with the future maintenance event to the operator in response to an indication/input (e.g., a database search query, a text input into a search field, a price quote request, and the like) that the operator is searching for parts/components associated with the future maintenance event. For example, if an operator searches a parts database for "piston," the recommendation can include recommending other parts associated with an engine rebuild (e.g., the crankshaft). Additionally, or alternatively, the recommendation can include a recommendation that the operator purchase one or more previously unpurchased parts and/or components (e.g., parts/components left in or removed from an online shopping cart, and the like) associated with the future maintenance event. In these and other embodiments the recommendation can include a recommendation to purchase one or more parts and/or components that are related to (e.g., alternative parts/components, equivalent parts/components, structurally and/or functionally similar parts/components, and the like) the parts/components associated with the future maintenance event.

In some embodiments, the time until the future maintenance event (block 203) and/or the recommendation (block 204) can be based at least partially on a geographic location or region in which the machine has operated. For example, machines in some geographic locations may benefit from more frequent maintenance events than machines in other geographic locations, and the time until the future maintenance event (block 203) and/or the recommendation (block 204) can vary based at least partially on the differences between these geographic locations. As another example, the cost of a maintenance event in some geographic locations may be greater than the cost of the maintenance event in other locations, and/or a wear rate for a part may vary based on location, and the time until the future maintenance event (block 203) and/or the recommendation (block 204) can vary based at least partially on the differences in cost and/or wear rate between these geographic locations.

In some embodiments, the recommendation can include a change to one or more supply chains. For example, one or more parts associated with the future maintenance event can be recommended for increased production. In some embodiments, the recommendation can include a research and/or development focus. For example, one or more parts associated with the future maintenance event can be recommended for redesign, e.g., to at least partially reduce the likelihood of future repair events. Additionally, or alternatively, the recommendation can include a recommendation to increase production of one or more parts and/or components associated with the future maintenance event. In some aspects, increasing production of parts and/or components that are subject to relatively frequent maintenance can at least partially mitigate or prevent future supply chain shortages.

In some embodiments, block 204 can include predicting/identifying information associated with the operator of the machine (block 201). In at least some embodiments, for example, block 203 can include classifying the operator's machine maintenance history (e.g., does not perform rebuilds, frequently performs early maintenance, performs maintenance only when machine fails, and the like) and/or the operator's parts purchase history (e.g., only purchases parts in bulk from over-the-counter dealers, shops around for competitively-priced parts, and the like).

In some embodiments, generating the one or more recommendations and/or predictions can include testing one or more of the recommendations and/or predictions. In at least some embodiments, testing one or more of the recommendations and/or predictions can include testing one or more of the recommendations and/or predictions based at least partially on historical maintenance data associated with a machine. For example, a predicted time until a future maintenance event for a given machine (block 203) can be compared against that machine's known maintenance history (e.g., at some time hours, days, weeks, years, etc., after the predicted time for that machine), for example, to determine whether the future maintenance event actually occurred, whether the future maintenance event occurred within the predicted time, and/or an error or difference (e.g., in number of hours run by the machine) between the predicted time and the actual time at which the future maintenance event was performed. Additionally, or alternatively, testing one or more of the recommendations and/or predictions can include testing one or more of the recommendations and/or predictions based at least partially on feedback from one or more operators associated with the machine. For example, after receiving the time until the future maintenance event (block 204), the operators can respond based on their knowledge of the machine's maintenance history/record, and provide responses or other feedback indicating, for example, that the prediction is not accurate, that the machine has already been serviced/rebuilt, and the like. In these and other embodiments, testing one or more of the recommendations and/or predictions can include testing one or more of the recommendations and/or predictions based at least partially on received information that is associated with the future maintenance event. For example, if a recommendation to replace a given part for a given machine is sent to a given operator, and at some time later (e.g., before, at, or after the predicted time) the operator submits an invoice including the part for the machine, the invoice can indicate that the predicted time and/or the future maintenance event were correct. Additionally, or alternatively, testing one or more of the recommendations and/or predictions can include testing one or more of the recommendations and/or predictions based at least partially on data (e.g., sensor data, telematics data, and the like) from the machine. For example, the machine can include one or more sensors associated with the machine's operation and configured to sense data related to the machine's components/parts, and the sensor data collected for the component(s)/part(s) associated the future maintenance event can be analyzed and/or evaluated, for example, to determine whether the sensor data indicates that the component(s)/part(s) are operating normally or abnormally and/or whether the predicted time and/or the predicted future maintenance event is accurate.

Although the steps of the method 200 are discussed and illustrated in a particular order, the method 200 illustrated in FIG. 2 is not so limited. A person of ordinary skill in the relevant art will recognize that the illustrated method 200 can be altered and still remain within these and other embodiments of the present technology. For example, one or more steps of the method 200 (e.g., block 204) illustrated in FIG. 2 can be omitted and/or repeated in some embodiments.

Figure 3:
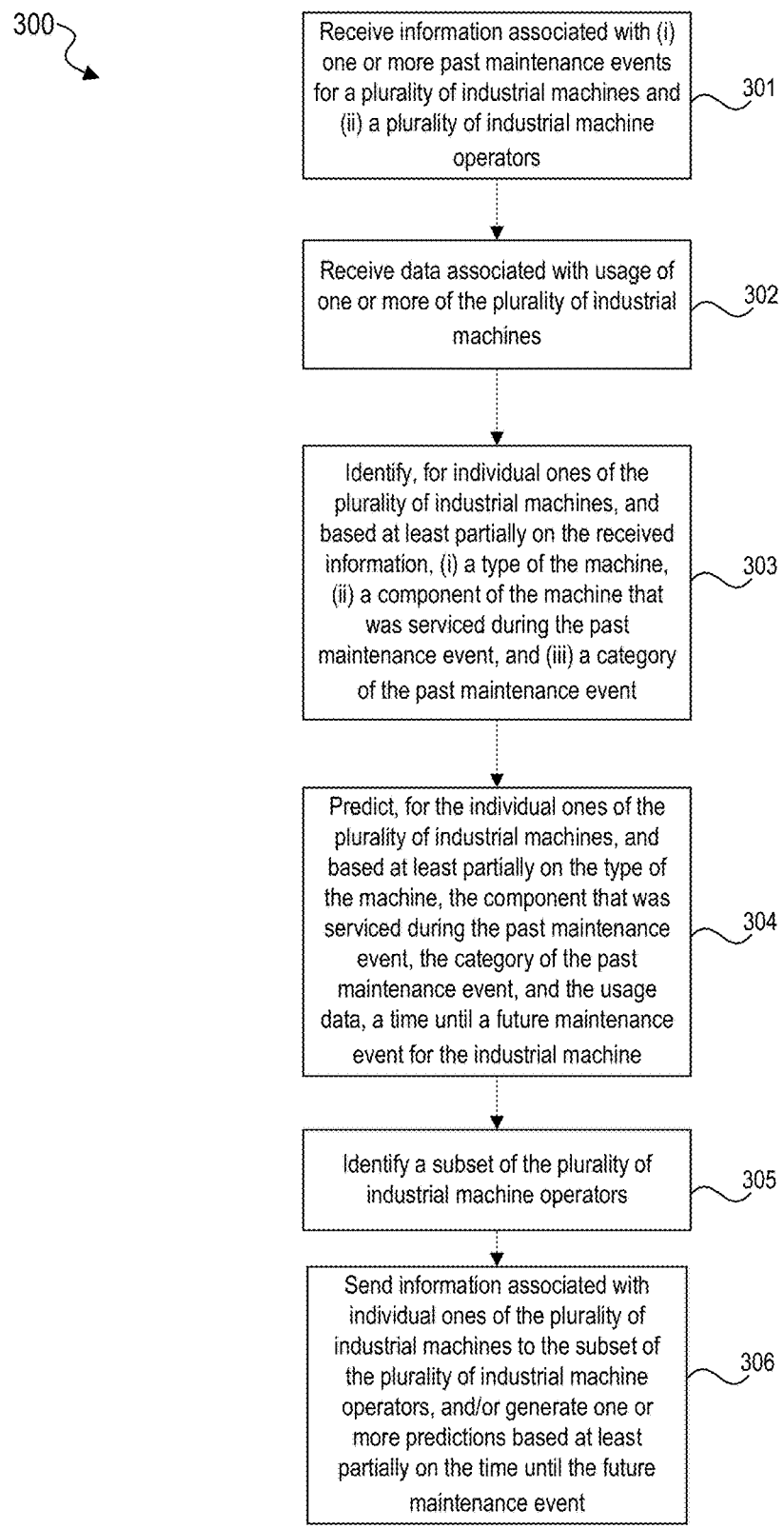
FIG. 3 is a flow diagram illustrating a method for predicting maintenance events for machines in accordance with embodiments of the present technology.

FIG. 3 is a flow diagram illustrating a method 300 for predicting maintenance events for machines in accordance with embodiments of the present technology. The method 300 is illustrated as a set of blocks, steps, operations, or processes 301-306. Several of the blocks 301-306 are described with reference to FIG. 1 and/or FIG. 2. All or a subset of the blocks 301-306 can be executed at least in part by various components of a device and/or a system, such as the device 400 of FIG. 4, and/or any other suitable device and/or system. Additionally, or alternatively, all or a subset of the blocks 301-306 can be executed at least in part by an operator (e.g., a remote operator, a human operator, and institutional operator, a corporate operator, and the like) of the device and/or system. Furthermore, any one or more of the blocks 301-306 can be executed in accordance with the discussion herein.

The method 300 begins at block 301 by receiving information associated with (i) one or more past maintenance events for a plurality of industrial machines and/or (ii) a plurality of industrial machine operators. Step 301 can include some features generally similar or identical to features of step 201 of the method 200. The plurality of industrial machine operators can be associated with one or more of the plurality of the industrial machines, such that the received information associated with the past maintenance events can also be associated/correlated with one or more of the industrial machine operators.

At block 302, the method 300 continues by receiving data associated with usage of one or more of the plurality of industrial machines. The received usage data can include one or more identifiers corresponding to one or more jobs or tasks, a number of operation hours, fuel burn data, machine inspections, machine status alerts, one or more geographic locations or regions in which the industrial machine is operated, environmental conditions (e.g., temperature, elevation, terrain, and the like), temporal/seasonal conditions (e.g., spring, summer, winter, fall, etc.) and/or any other suitable data associated with usage of one or more of the industrial machines.

At block 303, the method 300 continues by identifying, for individual ones of the plurality of industrial machines and based at least partially on the received information, at least one of (i) a type of the machine, (ii) a component of the machine that was serviced during the past maintenance event, and/or (iii) a category of the past maintenance event. At least some aspects of block 303 can include features generally similar or identical to aspects of block 202 of the method 200. Additionally, in some embodiments block 303 can further include identifying a fleet of machines owned/operated by a same industrial machine operator. For example, because the received information (block 301) can be associated with specific industrial machines and specific industrial machine operators, identifying the type of the machine in block 303 can be used to identify the types of machines in a fleet of machines owned/operated by one or more of the industrial machine operators. In some aspects, this can further supplement or "gap-fill" the information known about individual ones of the industrial machine operators.

In some embodiments, block 303 can include sorting the received information (block 301) and/or identified information based on generally similar or identical aspects. In at least some embodiments, for example, block 303 can further include aggregating the received and/or identified information associated with a given category of past maintenance event. As another example, block 303 can include aggregating the received and/or identified information associated with one or more industrial machines and/or one or more industrial machine operators. In these and other embodiments, the received and/or identified information can be aggregated/sorted based on any other characteristics described herein and/or any other suitable characteristics. The sorted information can be used to make one or more predictions and/or recommendations, such as described previously regarding block 204 of FIG. 2 and in block 304 below.

At block 304, the method 300 continues by predicting, for the individual ones of the plurality of industrial machines and based at least partially on the identification in block 303 and/or the received usage data (block 302), a time until a future maintenance event. Because the received information (block 301) and the received usage data (block 302) can be specific to or otherwise associated with individual industrial machines, the predicted time and/or the future maintenance event can be specific to individual ones of the plurality of the industrial machines. In at least some embodiments, for example, block 304 can including predicting a first time until a first future maintenance event for a first industrial machine, and predicting a second time until a second future maintenance event for a second industrial machine, and the first time and/or the first future maintenance event can be different than the second time and/or the second future maintenance event, respectively. The difference between the prediction for the first machine and the second machine can be based at least partially on the received usage information (block 302), such as a difference in geographic location, environmental conditions, and/or seasonal conditions for the first and second machines, as described previously regarding the method 200 of FIG. 2. In these and other embodiments, block 304 can include predicting a plurality of times for a corresponding plurality of future maintenance events for individual ones of the plurality of the industrial machines.

At block 305, the method 300 continues by identifying one or more subsets or segments of the plurality of industrial machine operators. In some embodiments, identifying a subset of the plurality of industrial machine operators can include sorting/segmenting the received information (block 301), the usage information (block 302), and/or the identified information (block 303) to identify generally similar industrial machine operators. For example, a subset/segment of industrial machine operators may all own a same type of industrial machine, have generally similar or identically machine fleets (e.g., size, type of machines, industry sector, and the like), operate various industrial machines in a same or generally similar geographic location, perform maintenance events at a same or generally similar frequency, and/or have performed generally similar or the same maintenance events in the past. The subset of the plurality of industrial machine operators can be identified manually and/or automatically (e.g., via one or more computer models, machine learning models, rules-based models, and the like). Additionally, or alternatively, the subset of the industrial machine operators can be based at least partially on an operator hierarchy, including parent-child business relationships between the operators (e.g., all operators owned by Company A, all operators that own two own companies with specific type(s) of machine(s), and the like). In at least some embodiments, block 305 can include identifying a plurality of subsets, such substantially all or every industrial machine operator is grouped/sorted into a corresponding subset.

At block 306, the method 300 continues by sending information associated with individual ones of the plurality of industrial machines to at least the subset/segment of the plurality of industrial machine operators (block 305). At least some aspects of block 306 can be generally similar or identical to aspects of block 204 of the method 200. The information can include the predicted time until the future maintenance event (block 304), one or more recommendations associated with individual ones of the industrial machines, and/or any other suitable information. Additionally, in at least some embodiments block 304 can include generating one or more predictions and/or recommendations without sending them to the operators, and/or sending one or more of the generated predictions and/or recommendations to all operators. The predictions and/or recommendations can include at least some aspects that are generally similar to or the same as the recommendations discussed in detail regarding block 204 of the method 200. In some embodiments, generating one or more of the recommendations and/or predictions can include testing one or more of the recommendations and/or predictions for all, a subset, or individual ones of the machines, such as described previously regarding FIG. 2.

Although the steps of the method 300 are discussed and illustrated in a particular order, the method 300 illustrated in FIG. 3 is not so limited. A person of ordinary skill in the relevant art will recognize that the illustrated method 300 can be altered and still remain within these and other embodiments of the present technology. For example, one or more steps of the method 300 (e.g., block 306) illustrated in FIG. 2 can be omitted and/or repeated in some embodiments.

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
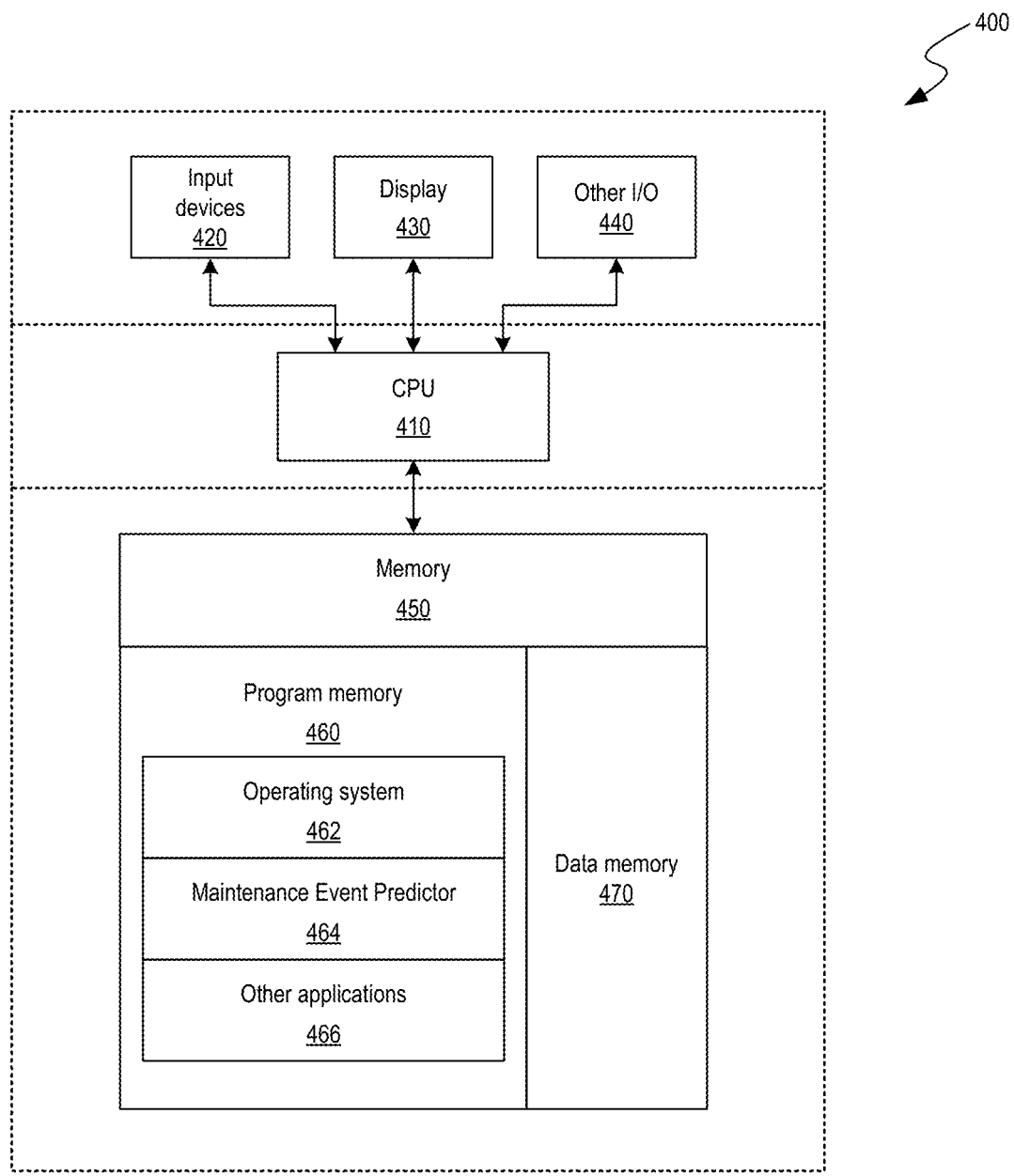
FIG. 4 is a block diagram illustrating an overview of devices on which some implementations can operate, in accordance with embodiments of the present technology.

Several implementations are discussed below in more detail in reference to the figures. FIG. 4 is a block diagram illustrating an overview of devices on which some implementations of the disclosed technology can operate. The devices can comprise hardware components of a system 400 that predicts maintenance events, for example. System 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the one or more of input devices 420 as part of the display 430, such as when one of the input devices 420 is a touchscreen or is equipped with an eye direction monitoring system. In some implementations, the display 430 is separate from the input devices 420. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, sensor, camera, printer, speakers, CD-ROM drive, DVD drive, disk drive, or Blu-Ray device.

In some implementations, the system 400 also includes a communication device capable of communicating wirelessly or wire-based with a network node. The communication device can communicate with another device or a server through a network using, for example, TCP/IP protocols. System 400 can utilize the communication device to distribute operations across multiple network devices.

The CPU 410 can have access to a memory 450. The memory 450 includes one or more of various hardware devices for volatile and non-volatile storage, and can include both read-only and writable memory. For example, the memory 450 can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. The memory is not a propagating signal divorced from underlying hardware; the memory is thus non-transitory. The memory 450 can include program memory 460 that stores programs and software, such as an operating system 462, Predictor 464 (which may include instructions for carrying out the methods of maintenance event prediction disclosed herein), and other application programs 466. Memory 450 can also include data memory 470 that can include database information, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
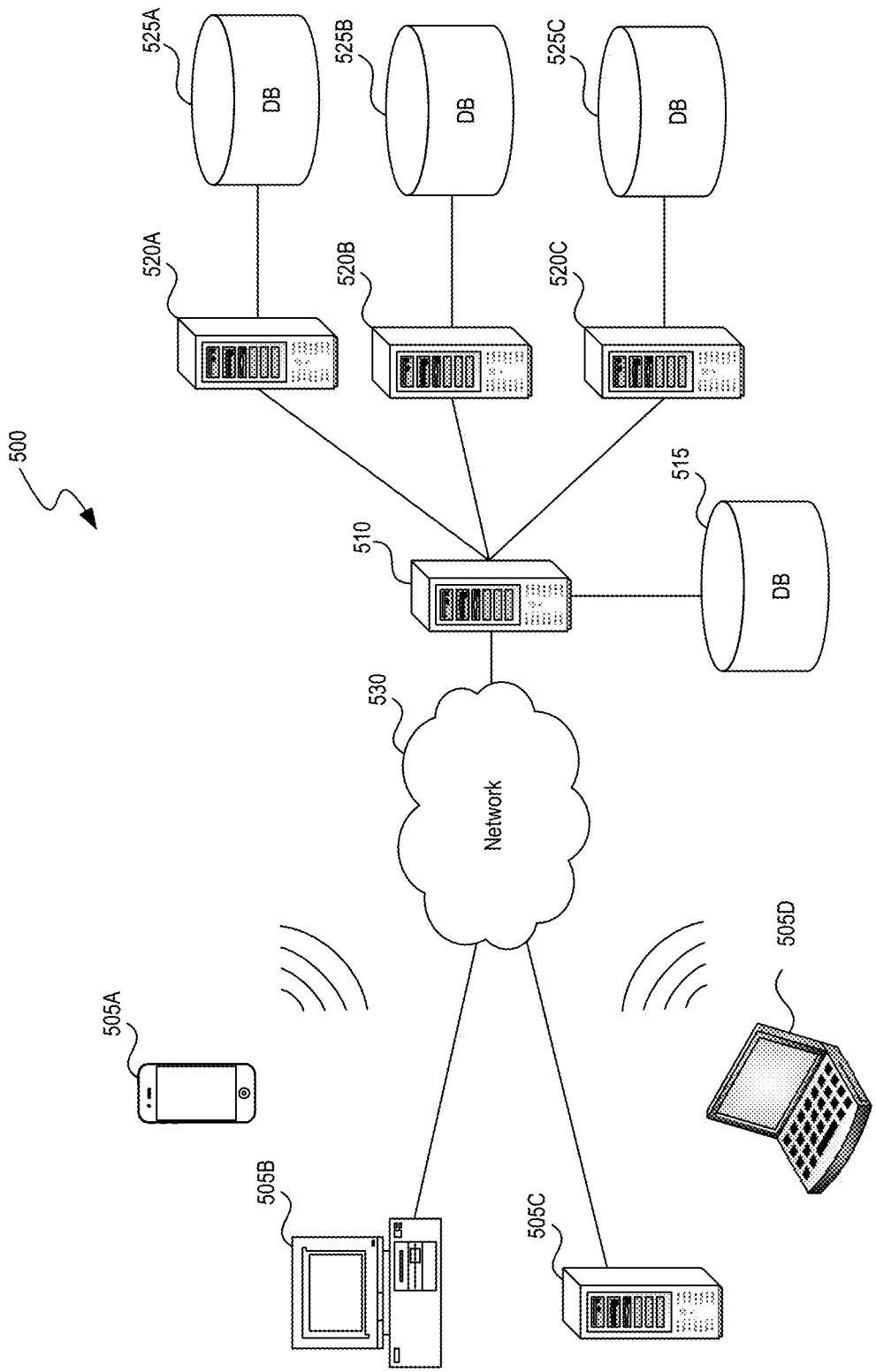
FIG. 5 is a block diagram illustrating an overview of an environment in which some implementations can operate, in accordance with embodiments of the present technology.

FIG. 5 is a block diagram illustrating an overview of an environment 500 in which some implementations of the disclosed technology can operate. Environment 500 can include one or more client computing devices 505A-D, examples of which can include the system 400 of FIG. 4. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and/or servers 520A-C can comprise computing systems, such as the system 400 of FIG. 4. Though the server computing device 510 and servers 520A-C are each displayed logically as a single server, servers 510 and/or server computing devices 520A-C can each be a distributed computing environment encompassing multiple computing devices located at the same or at geographically disparate physical locations. In some implementations, each server 510 and/or server computing device 520A-C corresponds to a group of servers.

Client computing devices 505, server 510, and/or server computing devices 520A-C can each act as a server or client to other server/client devices. Server 510 can connect to a database 515. Server computing devices 520A-C can each connect to a corresponding database 525A-C. As discussed above, each server computing device 520A-C can correspond to a group of servers, and each of these servers can share a database or can have their own database. Databases 515 and 525 can warehouse (e.g., store) information. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and server computing devices 520A-C are shown as separate connections, these connections can be any kind of local, wide area, wired, or wireless network, including network 530 or a separate public or private network.

Figure 6:
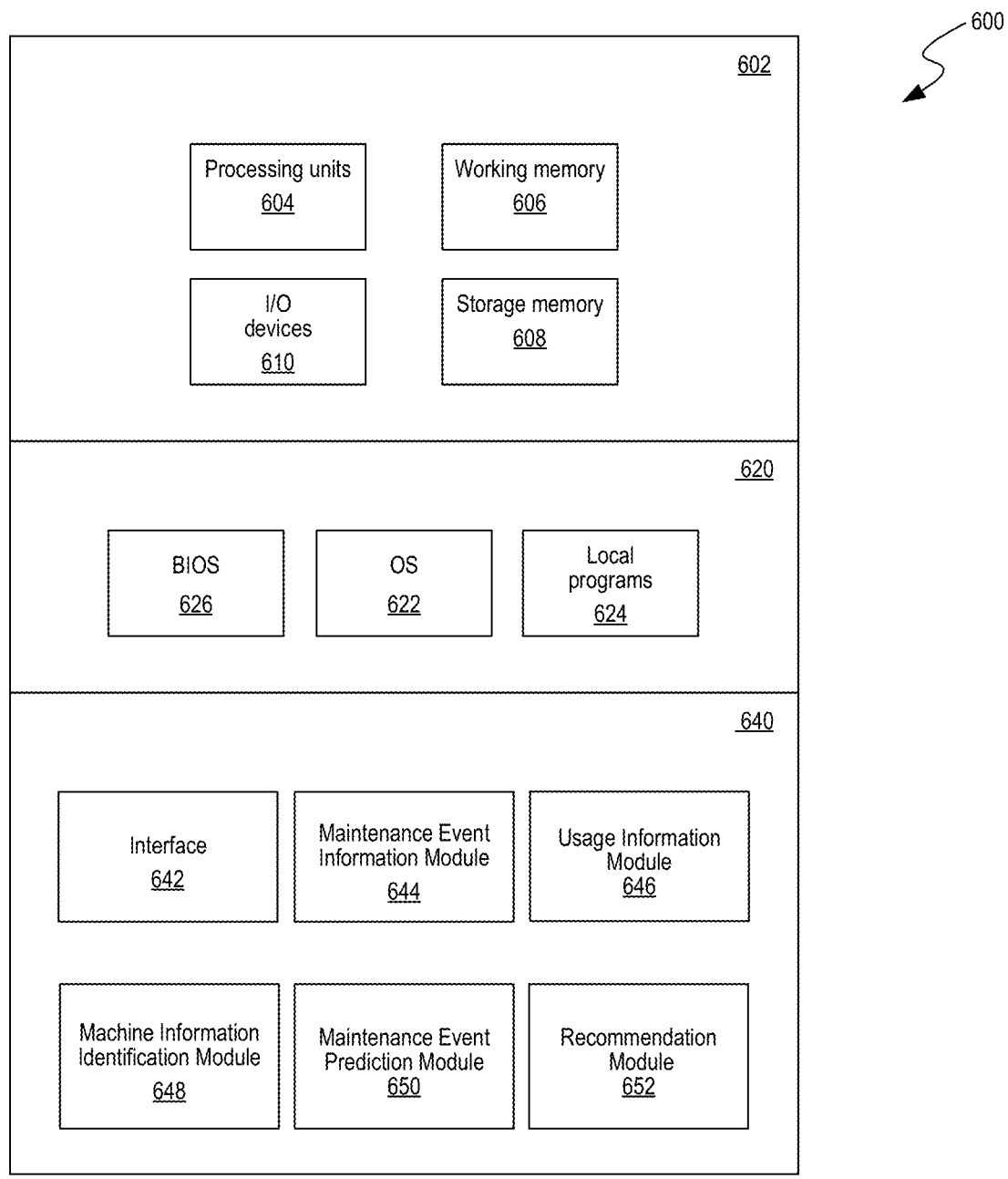
FIG. 6 is a block diagram illustrating elements which, in some implementations, can be used in a system employing the disclosed technology, in accordance with embodiments of the present technology.

FIG. 6 is a block diagram illustrating elements 600 which, in some implementations, can be used in a system employing the disclosed technology. The elements 600 include hardware 602, general software 620, and specialized elements 640. As discussed above, a system implementing the disclosed technology can use various hardware, including processing units 604 (e.g., CPUs, GPUs, APUs, etc.), working memory 606, storage memory 608, and input and output devices 610. Elements 600 can be implemented in a client computing device such as client computing devices 505 or on a server computing device, such as server 510 and/or server computing devices 520A-C.

General software 620 can include various applications, including an operating system 622, local programs 624, and a basic input output system (BIOS) 626. Specialized components 640 can be subcomponents of a general software application 620, such as local programs 624. Specialized elements 640 can include a Maintenance Event Information Module 644, a Usage Information Module 646, a Machine Information Identification Module 648, a Maintenance Event Predictor Module 650, and a Recommendation Module 652, and components that can be used for transferring data and controlling the specialized components, such as interface 642. In some implementations, elements 600 can be in a computing system that is distributed across multiple computing devices or can be an interface to a server-based application executing one or more of specialized elements 640.

Those skilled in the art will appreciate that the components illustrated in FIGS. 4-6 described above, and in each of the FIGS. 1-3 discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

B. INDUSTRIAL APPLICABILITY

In some embodiments, systems for automatically recommending repair can include a Maintenance Event Information Module 644, a Usage Information Module 646, a Machine Information Identification Module 648, a Maintenance Event Predictor Module 650, and a Recommendation Module 652 (FIG. 6). In operation, the Maintenance Event Information Module 644 can receive and/or store maintenance event information (see block 201 of the method 200 and block 301 of the method 300). The Usage Information Module 646 can receive and store machine usage information (see block 302 of the method 300). The Machine Information Identification Module 648 can include instructions for identifying information associated with a machine, such as (i) a type of the machine, (ii) a component of the machine that was serviced during the past maintenance event, and (iii) a category of the past maintenance event (see block 202 of the method 200, block 303 of the method 300). The Maintenance Event Prediction Module 650 can include instructions for predicting a future maintenance event and/or a time until the future maintenance event (see block 203 of the method 200, block 304 of the method 300). The Recommendation Module 652 can include instructions, models, and the like for making recommendations (see block 204 of the method 200, block 306 of the method 300). The Recommendation Module 562 can make recommendations based at least partially on the future maintenance event and/or the time until the future maintenance event identified by the Maintenance Event Prediction Module 650. The disclosed technology, therefore, can automatically predict a future maintenance event for a machine, predict a time until the future maintenance event, and/or make a recommendation, such as a time to complete a future maintenance event, which can be based on impartial or incomplete information about a given machine and/or the given machine's maintenance history.

C. CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any materials incorporated herein by reference conflict with the present disclosure, the present disclosure controls. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Where the context permits, singular or plural terms can also include the plural or singular term, respectively. Additionally, the terms "comprising," "including," "having" and "with" are used throughout to mean including at least the recited feature(s) such that any greater number of the same feature and/or additional types of other features are not precluded.

Furthermore, as used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B, and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while blocks are presented in a given order, alternative embodiments can perform blocks in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. Rather, the embodiments are intended to cover all modifications, combinations, equivalents, and alternatives falling within the scope of this disclosure.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

Reference in this specification to "one embodiment" or "an embodiment" means that a particular feature, structure, or characteristic described in connection with the embodiment is included in at least one embodiment of the disclosure. The appearances of the phrase "in one embodiment" (or the like) in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A method for providing future maintenance event predictions for an industrial machine based on partial maintenance history data for the industrial machine, the method comprising:
    receiving information associated with a past maintenance event of the industrial machine, the information comprising an indication of geographic location in which the industrial machine was used prior to the past maintenance event;
    identifying, based at least partially on the received information, maintenance information associated with the past maintenance event, including (i) a type of the industrial machine, (ii) a component of the industrial machine that was serviced during the past maintenance event, wherein the component is associated with one or more parts, and (iii) a category of the past maintenance event;
    determining, based on the geographic location, a part wear rate for the one or more parts;
    predicting, based at least partially on the type of the industrial machine, the component that was serviced during the past maintenance event, the category of the past maintenance event, and the determined part wear rate determined based on the geographic location, a time until a future maintenance event for the industrial machine;
    generating a recommendation for the one or more parts, wherein the recommendation comprises: (i) the time until the future maintenance event and (ii) a recommended production level for the one or more parts determined using the predicted time until the future maintenance event; and
    operating the one or more parts, using additional sensor data, according to the generated recommendation.

2. The method of claim 1 wherein receiving information includes receiving at least one of an invoice, a work order, and/or a parts order associated with the industrial machine.

3. The method of claim 1 wherein at least one of the one or more parts is an indicator part, and wherein identifying at least one of the (i) the type of the industrial machine, (ii) the component that was serviced during the past maintenance event, and/or (iii) the category of the past maintenance event is based at least partially on the indicator part.

4. The method of claim 1 wherein predicting the time until the future maintenance event includes predicting the time until a future maintenance event for the component.

5. The method of claim 1, wherein the received data includes seasonal data associated with a season in which the industrial machine was used prior to the past maintenance event, and wherein the predicted time until the future maintenance event is based at least partially on the seasonal data.

6. The method of claim 1 wherein the industrial machine is a first industrial machine, and wherein predicting the time until the future maintenance event includes predicting the time until the future maintenance event for a second industrial machine based at least partially on the received information for the first industrial machine.

7. The method of claim 1, further comprising:
    generating a recommended part redesign for the one or more parts; and
    testing the generated recommended part redesign.

8. A maintenance event prediction system for predicting future maintenance events for industrial machines based on partial maintenance history data, the maintenance event prediction system comprising:
    one or more processors; and
    a non-transitory computer readable memory having instructions that, when executed by the one or more processors, cause the maintenance event prediction system to:
        receive information associated with a past maintenance event of an industrial machine, the information comprising an indication of geographic location in which the industrial machine was used prior to the past maintenance event;
        identify, based at least partially on the receive information, maintenance information associated with the past maintenance event, including (i) a type of the industrial machine, (ii) a component of the industrial machine that was serviced during the past maintenance event, wherein the component is associated with one or more parts and (iii) a category of the past maintenance event;
        determine, based on the geographic location, a part wear rate for the one or more parts;
        predict, based at least partially on the type of the industrial machine, the component that was serviced during the past maintenance event, the category of the past maintenance event, and the determined part wear rate determined based on the geographic location, a time until a future maintenance event for the industrial machine;
        generating a recommendation for the one or more parts, wherein the recommendation comprises: (i) the time until the future maintenance event and (ii) a recommended production level for the one or more parts determined using the predicted time until the future maintenance event; and
        operating the one or more parts, using additional sensor data, according to the generated recommendation.

9. The maintenance event prediction system of claim 8 wherein the receive information includes at least one of an invoice, a work order, and/or a parts order associated with the industrial machine.

10. The maintenance event prediction system of claim 8 wherein at least one of the one or more parts is an indicator part, and wherein identifying at least one of (i) the type of the industrial machine, (ii) the component that was serviced during the past maintenance event, and/or (iii) the category of the past maintenance event based at least partially on the indicator part.

11. The maintenance event prediction system of claim 8 wherein the time until the future maintenance event includes the time until a future maintenance event for the component.

12. The maintenance event prediction system of claim 8 wherein the instructions further cause the maintenance event prediction system to receive operation data associated with operation of the industrial machine and predict the time until the future maintenance event based at least partially on the received operation data.

13. The maintenance event prediction system of claim 8 wherein the instructions further cause the maintenance event prediction system to receive operation data associated with operation of the industrial machine, and predict the time until the future maintenance event based at least partially on the received operation data, wherein receiving the operation data includes receiving at least one of seasonal usage data and/or environmental condition data.

14. A non-transitory computer-readable media storing computer-executable instructions for predicting future maintenance events for industrial machines based on partial maintenance history data that, when executed by one or more processors of a maintenance event prediction system, cause the maintenance event prediction system to performing operations comprising:

receiving information associated with a past maintenance event of an industrial machine, the information comprising an indication of geographic location in which the industrial machine was used prior to the past maintenance event;

identifying, based at least partially on the received information, maintenance information associated with the past maintenance event, including (i) a type of the industrial machine, (ii) a component of the industrial machine that was serviced during the past maintenance event, wherein the component is associated with one or more parts, and (iii) a category of the past maintenance event;

determining, based on the geographic location, a part wear rate for the one or more parts;

predicting, based at least partially on the type of the industrial machine, the component that was serviced during the past maintenance event, the category of the past maintenance event, and the determined part wear rate determined based on the geographic location, a time until a future maintenance event for the industrial machine;

generating a recommendation for the one or more parts, wherein the recommendation comprises: (i) the time until the future maintenance event and (ii) a recommended production level for the one or more parts determined using the predicted time until the future maintenance event; and operating the one or more parts, using additional sensor data, according to the generated recommendation.

15. The non-transitory computer-readable media of claim 14 wherein receiving information includes receiving at least one of an invoice, a work order, and/or a parts order associated with the industrial machine.

16. The non-transitory computer-readable media of claim 14 wherein at least one of the one or more parts is an indicator part, and wherein identifying at least one of the (i) the type of the industrial machine, (ii) the component that was serviced during the past maintenance event, and/or (iii) the category of the past maintenance event is based at least partially on the indicator part.

17. The non-transitory computer-readable media of claim 14 wherein predicting the time until the future maintenance event includes predicting the time until a future maintenance event associated with the component.

18. The non-transitory computer-readable media of claim 14 wherein the industrial machine is a first industrial machine, and wherein predicting the time until the future maintenance event includes predicting the time until the future maintenance event for a second industrial machine based at least partially on the information for the first industrial machine.

\* \* \* \* \*